(12) United States Patent
Matsumoto et al.

(10) Patent No.: US 7,641,269 B2
(45) Date of Patent: Jan. 5, 2010

(54) VEHICULAR BODY STRUCTURE

(75) Inventors: Yoshiyuki Matsumoto, Wako (JP); Yojiro Tsutsumi, Wako (JP); Masaaki Abe, Wako (JP); Isao Uematsu, Wako (JP); Kazuyuki Maruyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 11/659,818

(22) PCT Filed: Sep. 29, 2005

(86) PCT No.: PCT/JP2005/018495

§ 371 (c)(1),
(2), (4) Date: Apr. 18, 2007

(87) PCT Pub. No.: WO2006/036013

PCT Pub. Date: Apr. 6, 2006

(65) Prior Publication Data

US 2007/0216189 A1    Sep. 20, 2007

(30) Foreign Application Priority Data

Sep. 30, 2004    (JP) .............................. 2004-286872

(51) Int. Cl.
*B60J 1/02* (2006.01)
(52) U.S. Cl. ................. 296/203.01; 280/756; 296/84.1; 296/96.21; 296/190.1; 296/193.06
(58) Field of Classification Search ................ 280/756; 296/84.1, 96.12, 96.18, 96.21, 190.01, 190.08, 296/190.1, 193.06, 203.01
See application file for complete search history.

(56) References Cited

U.S. PATENT DOCUMENTS

| 1,034,534 | A | * | 8/1912 | Thomas ..................... 296/84.1 |
| 1,146,666 | A | * | 7/1915 | Strickler ..................... 280/748 |
| 1,269,447 | A | * | 6/1918 | Hover ........................ 296/96.2 |
| 1,347,461 | A | * | 7/1920 | Helpling ...................... 296/90 |
| 1,545,727 | A | * | 7/1925 | Barndt ........................ 296/200 |

(Continued)

FOREIGN PATENT DOCUMENTS

| DE | 12 86 418 B | | 1/1969 |
| FR | 774 173 A | | 11/1934 |
| GB | 477 430 A | | 12/1937 |
| GB | 2177360 A | * | 1/1987 |
| JP | 56025062 A | * | 3/1981 |
| JP | 01141120 A | * | 6/1989 |
| JP | H05-35993 Y2 | | 9/1993 |
| JP | 2002284035 A | * | 10/2002 |

*Primary Examiner*—Glenn Dayoan
*Assistant Examiner*—Paul A Chenevert
(74) *Attorney, Agent, or Firm*—Birch, Stewart, Kolasch & Birch, LLP

(57) ABSTRACT

In a vehicular body structure, left and right front pillars are provided closer to the longitudinal centerline of a vehicle than left and right corner sections of a compartment of the vehicle. First corner window (26) provided adjacent to one of the left and right front pillars (13) which is more remote from a driver's seat (24) has a greater opening area than a second corner window (25) provided adjacent to the other of the left and right pillars (11) which is closer to the driver's seat.

17 Claims, 7 Drawing Sheets

U.S. PATENT DOCUMENTS

| | | | | |
|---|---|---|---|---|
| 1,668,682 A | * | 5/1928 | Kohlberger | 296/96.18 |
| 1,678,479 A | * | 7/1928 | Patten et al. | 359/837 |
| 1,875,227 A | * | 8/1932 | Dyer | 296/96.2 |
| 2,437,664 A | * | 3/1948 | Hicks | 296/96.12 |
| D167,906 S | * | 10/1952 | Muller | D12/92 |
| 2,751,246 A | * | 6/1956 | Barenyi | 296/200 |
| 4,807,925 A | * | 2/1989 | Sakamoto et al. | 296/203.02 |
| 6,860,540 B2 | * | 3/2005 | Yoshida | 296/96.12 |
| 7,100,960 B2 | * | 9/2006 | Iwao et al. | 296/84.1 |
| 7,494,178 B2 | * | 2/2009 | Nygaard | 296/187.01 |

\* cited by examiner

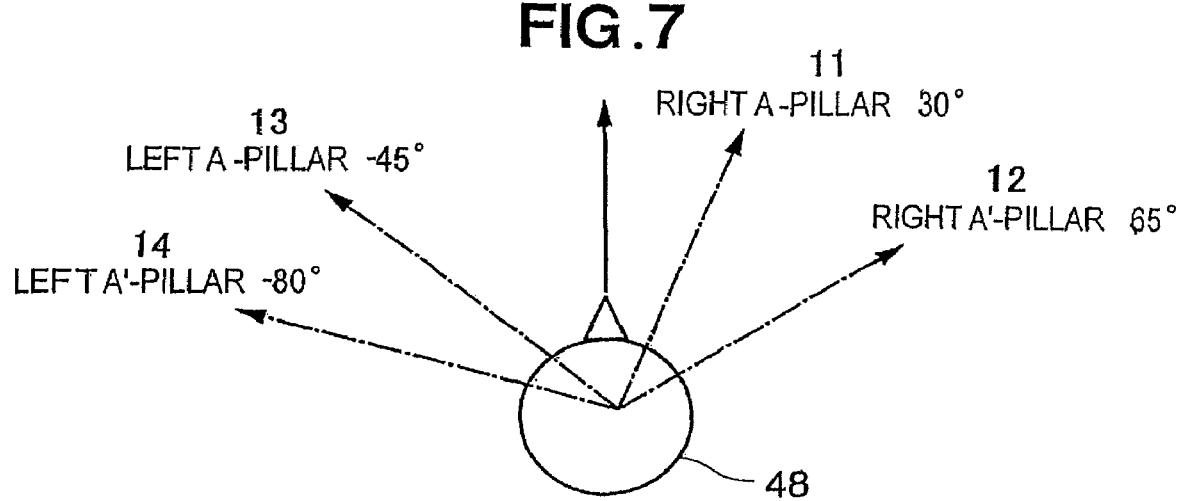
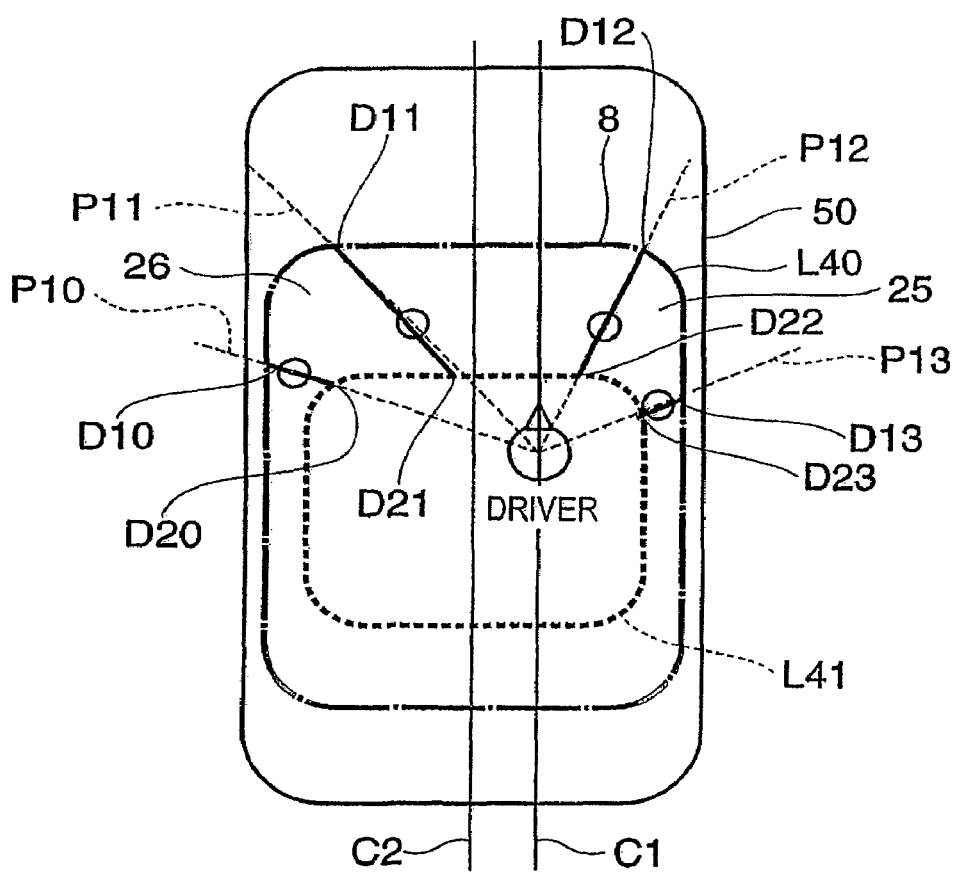

006# VEHICULAR BODY STRUCTURE

TECHNICAL FIELD

The present invention relates to vehicular body structures, and more particularly to a novel vehicular body structure having front pillars designed to improve a field of vision (or range of vision) of a vehicle driver.

BACKGROUND ART

To date, various improvements have been made to four-wheeled motor vehicles to achieve enhanced comfort, performance and various efficiencies of the vehicles. For example, improvements have been made to the sectional shape and material of front pillars such that the front pillars can provide a sufficient vehicular body strength while securing certain good viewing fields in diagonally forward left and right directions. Especially, in making left and right turns at intersections, each vehicle driver is required to carefully look, i.e., visually confirm conditions, around the vehicle, e.g. to the left and right of the vehicle as well as in front of the vehicle. In thus visually confirming safe conditions around the vehicle, the front pillars (commonly known as A-pillars or A-post) would inevitably produce field-of-vision blocking areas due to the conventional vehicle construction. To avoid such an inconvenience, there have so far been proposed (1) vehicles equipped with no pillar (i.e., "pillarless" vehicles) and (2) vehicles with pillars of a truss construction having a multiplicity of triangular gaps to minimize the field-of-vision blocking areas (for example, Japanese Patent Laid-Open Publication No. 2002-284035).

The vehicles, in which pillars are dispensed with so as to avoid unwanted field-of-vision blocking areas, suffer from the problem of difficulty in securing sufficient strength of the vehicular body. Thus, such proposed pillarless vehicles have not yet been actualized or realized due to the insufficient strength problem etc. The vehicles with pillars of the truss construction having a multiplicity of triangular gaps, on the other hand, suffer from the problem that the construction is very complicated and manufacturing of the vehicle requires high cost and many man hours. Further, such a pillar construction would face limits to enhancement of visibility due to the trusses. Vehicular pillar construction which achieves enhanced visibility not only during straight-ahead travel but also during left or right turn of the vehicle can reduce stress of the driver during driving and thus achieve enhanced comfort.

DISCLOSURE OF THE INVENTION

In view of the foregoing, it is an object of the present invention to provide a vehicular body structure which can achieve an improved field of vision, with a simple structure and without requiring high manufacturing cost and many man hours, while securing sufficient vehicular body strength.

According to an aspect of the present invention, there is provided an improved vehicular body structure, which comprises left and right front pillars provided closer to the longitudinal centerline of the vehicle than left and right corner sections of a compartment of the vehicle.

According to another aspect of the present invention, there is provided an improved vehicular body structure, which comprises: a first corner window provided adjacent to one of left and right front pillars which is more remote from a driver's seat; and a second corner window provided adjacent to the other of the left and right pillars which is closer to the driver's seat, and in which the first corner window has a greater opening area than the second corner window.

Preferably, the left and right front pillars are provided at horizontal opposite ends of a front window that is provided to have its vertical centerline offset from the longitudinal centerline of the vehicle toward a driver's seat of the vehicle. The front window may also be provided to have its center of gravity offset from the longitudinal centerline of the vehicle toward the driver's seat of the vehicle.

Preferably, the left and right front pillars are provided in such a manner that, from an eye point position of a driver of the vehicle determined on the basis of predetermined physical size data, the left and right front pillars look as if extending vertically upright. Preferably, the left and right front pillars each have a horizontal width of 60 mm or below.

According to still another aspect of the present invention, there is provided a vehicular body structure for a vehicle with a right-hand steering wheel (i.e., right-hand drive vehicle), which comprises: a right corner window provided in a predetermined position to secure a driver's viewing angle range of 35°-60° rightward from a reference straight line extending in a front-and-rear direction of the vehicle through the center of the driver's seat of the vehicle; and a left corner window provided in a predetermined position to secure a driver's viewing angle range of 50°-75° leftward from the reference straight line.

According to still another aspect of the present invention, there is provided a vehicular body structure for a vehicle with a left-hand steering wheel (i.e., left-hand drive vehicle), which comprises: a left corner window provided in a predetermined position to secure a driver's viewing angle range of 35°-60° leftward from a reference straight line extending in a front-and-rear direction of the vehicle through the center of a driver's seat of the vehicle; and a right corner window provided in a predetermined position to secure a driver's viewing angle range of 50°-75° rightward from the reference straight line.

Preferably, the vehicular body structure further comprises first and second right front pillars provided at horizontal opposite ends of the right corner window, and first and second left front pillars provided at horizontal opposite ends of the left corner window. At the horizontal opposite ends of each of the right and left corner windows, the first and second right front pillars or the first and second left front pillars may be provided in such a manner that, from an eye point position of the driver of the vehicle determined on the basis of predetermined physical size data, the first and second right front pillars or the first and second left front pillars look as if extending vertically upright. Preferably, the first right front pillar and the first left front pillar each have a horizontal width of 60 mm or below.

In another embodiment, the vehicular body structure further comprises only a right front pillar and a right side pillar that are provided at horizontal opposite ends of the right corner window, and a left front pillar and a left side pillar that are provided at horizontal opposite ends of the left corner window. At opposed horizontal ends of the right and left corner windows, the right and left front pillars may be provided in such a manner that, from the eye point position of the driver of the vehicle, the right and left front pillars look as if extending vertically upright. Preferably, the right front pillar and left front pillar each have a horizontal width of 60 mm or below.

In a specific embodiment of the aforementioned vehicular body structure for a vehicle with a right-hand steering wheel, the first and second right front pillars and the first and second left front pillars together constitute a front pillar structure.

The right corner window is provided between the first and second right front pillars while the left corner window is provided between the first and second left front pillars. The right corner window is disposed in the predetermined position to secure the driver's viewing angle range of 35°-60° rightward from the zero-degree reference straight line while the left corner window is disposed in the predetermined position to secure the driver's viewing angle range of 50°-75° leftward from the zero-degree reference straight line. Specific embodiment of the aforementioned vehicular body structure for a vehicle with a left-hand steering wheel is constructed similarly to the aforementioned vehicular body structure for a vehicle with a right-band steering wheel, except that the left corner window is disposed in the predetermined position to secure the driver's viewing angle range of 35°-60° leftward from the zero-degree reference straight line while the right corner window is disposed in the predetermined position to secure the driver's viewing angle range of 50°-75° rightward from the zero-degree reference straight line.

With such arrangements of the corner windows, the present invention can achieve a significantly-improved field of vision, with a simple structure and without requiring high manufacturing cost and many man hours, while securing sufficient vehicular body strength. Further, because the first and second right front pillars and the first and second left front pillars are provided in such a manner that, from the eye point position of the driver of the vehicle, the first and second right front pillars and the first and second left front pillars look as if extending vertically upright, the present invention can achieve an even-further-improved field of vision. Furthermore, because each of the first and second right front pillars and the first and second left front pillars has a horizontal width of 60 mm or below, the present invention can substantially eliminate any unwanted field-of-vision blocking area.

BRIEF DESCRIPTION OF DRAWINGS

Certain preferred embodiments of the present invention will be described in detail below, by way of example only, with reference to the accompanying drawings, in which:

FIG. 7 is a top plan view showing angles of sight lines from the driver toward the positions of the pillars;

FIG. 8 is a top plan view showing determined positions of the front pillars;

BEST MODE FOR CARRYING OUT THE INVENTION

In many cases, a driver of a four-wheeled motor vehicle feels stressed in turning the vehicle to the left or right at an intersection, because the driver has to quickly complete the required left or right turn while checking or visually confirming many things, such as road conditions, traffic signals, etc. in a plurality of directions. In the conventional four-wheeled motor vehicles, front pillars are provided in left-right symmetry at horizontal opposite ends of a front window (i.e., opposite front corner sections of the vehicle compartment). Thus, in turning left or right at an intersection, the driver often has to visually check the surroundings by considerably switching his or her position or posture as necessary. The present invention is intended to improve visibility in diagonally forward left and right directions while securing a good forward field of vision as in the conventional counterparts.

Figure 1:
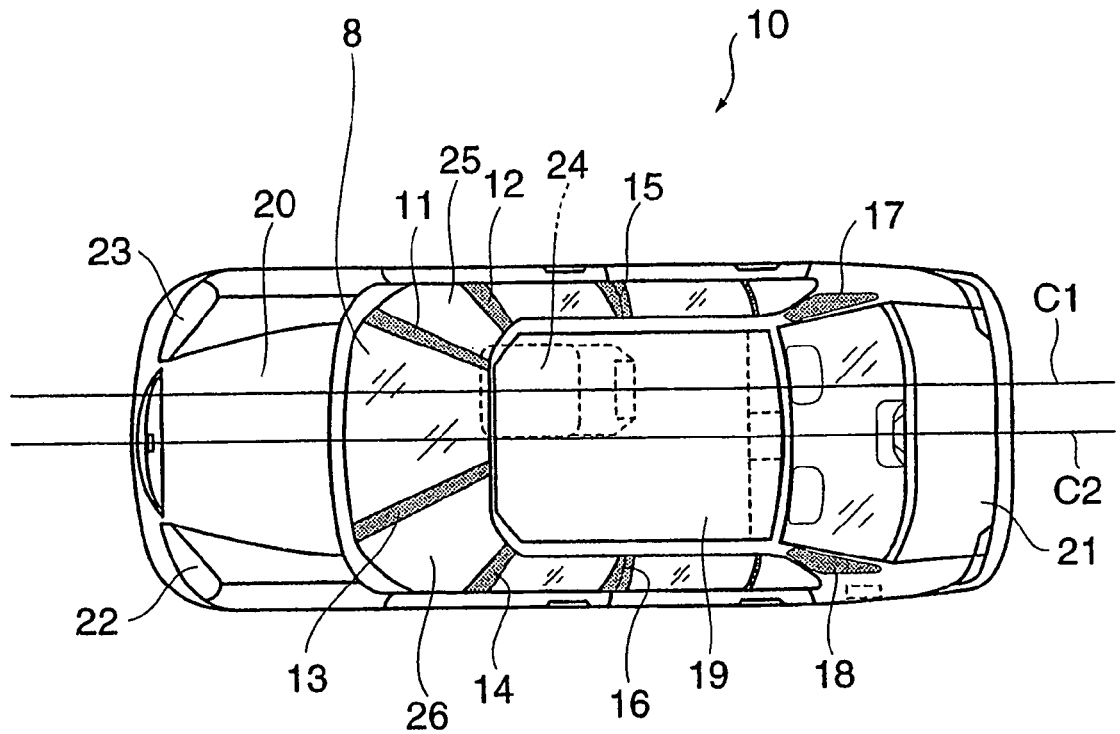
FIG. 1 is a top plan view of a vehicle employing a body structure according to a first embodiment of the present invention, which particularly shows novel arrangement of front pillars in the vehicle.
Figure 9:
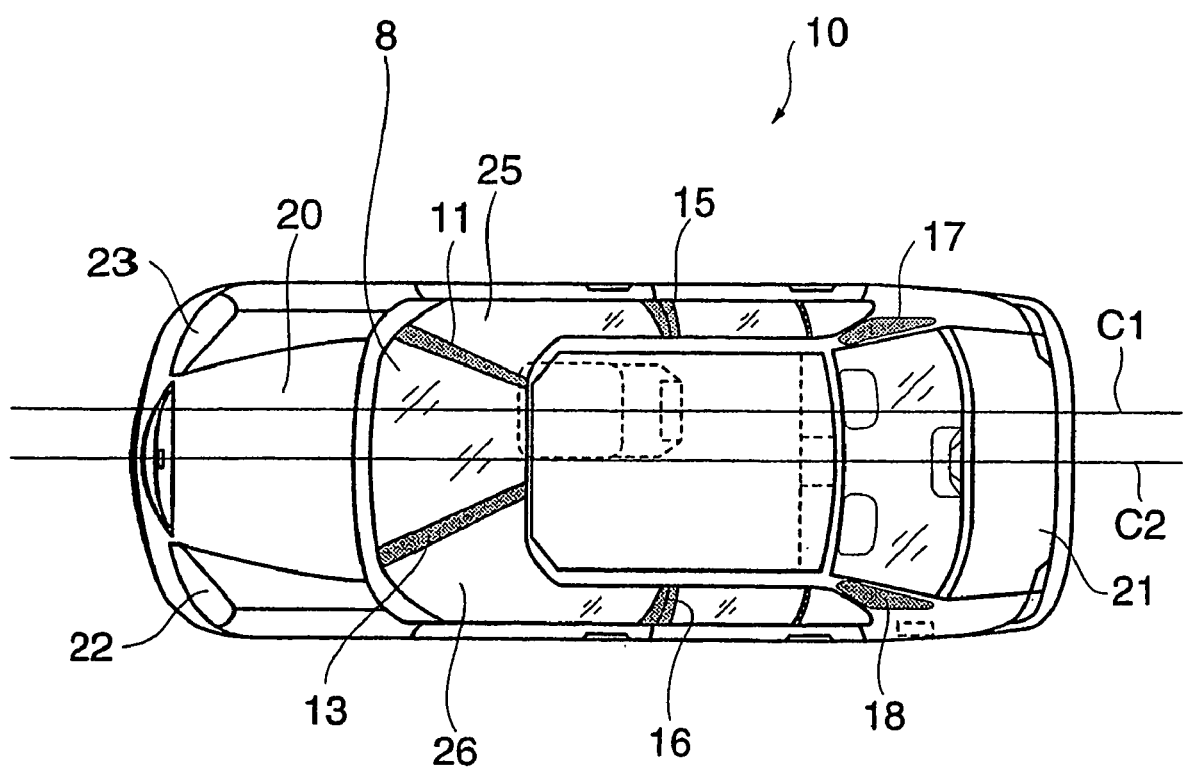
FIG. 9 is a top plan view of a vehicular body structure according to a second embodiment of the present invention.

The present invention is characterized in that front pillars 11 and 13 are disposed nearer to the longitudinal centerline C2, extending in a front-and-rear direction, of the vehicle than those in the conventional counterparts, as seen in FIGS. 1 and 9, to thereby improve visibility in diagonally forward left and right directions. The present invention can also secure a good forward field of vision as in the conventional counterparts by virtue of inventive arrangements and widths of the front pillars as will be explained later in detail.

The present invention is also characterized in that a front window 8 is offset from the longitudinal centerline C2 of the vehicle toward the driver's seat, and that a left corner window 26 has a greater size than a right corner window 25. The position of the front window 8 and relationship in opening area between the left and right corner window 25 and 26 are chosen such that substantially equal visibility is achieved in the diagonally forward left and right directions and the vehicle body can maintain sufficient vehicular body strength.

FIG. 1 is a plan view of a vehicle employing a body structure according to a first embodiment of the present invention.

As seen in FIG. 1, the vehicle 10 includes first and second right front pillars 11 and 12, first and second left front pillars 13 and 14, side pillars 15 and 16, and right and left rear pillars 17 and 18. The vehicle 10 also includes a roof 19, bonnet 20, trunk lid 21, head lamps 22 and 23, and a driver seat 24 in the interior of a vehicle compartment. The positions of the side pillars 15 and 16 and the rear pillars 17 and 18 are generally the same as those in the conventional counterparts.

The front pillars 11, 12, 13 and 14 are provided at positions that can avoid, or do not agree with, peak positions in distribution of view points —measured as a test driver turned a test vehicle, equipped with no pillar, to the left and right in later-described experimental tests—, and a neighborhood of the peak positions. The view points and viewing angle differ more or less among drivers according to their physical sizes (i.e., body sizes), and thus, shapes and positions of the front pillars 11-14 have been determined on the basis of assumption of a driver of an average physical size. More specifically, an average physical size of target customers of the vehicle, to which is applied the present invention, is calculated, and then shapes and positions of the front pillars 11-14 are chosen which can achieve an optimal field of vision when a driver of the average physical size turns the vehicle to the left and right at intersections and which can secure a sufficient strength of the vehicle body. The "average physical size" for Japanese is determined, for example, on the basis of "Japanese Physical Size Data 1992-1994" published by Human Research Institute of Human Engineering for Quality Life. Further, a "three-dimensional position of an eye point of a driver of the average physical size", which is the basis of the pillar positioning, can be determined by the driver of the average physical size adjusting the position of the driver's seat a plurality of times.

Note that the design of the front pillars may be customized for each individual customer in response to the recent enhancement of customer orientation. In this case, physical size data of a customer in question are acquired prior to manufacturing of a vehicle, and a third person or the customer drives a vehicle equipped with no front pillar (i.e., front-pillarless vehicle) so that distribution of view points is measured as the driver turns the vehicle to the left and right. Then, respective positions of the front pillars are determined, on the basis of the measured results, to manufacture a vehicle that fits the driver.

Figure 4:
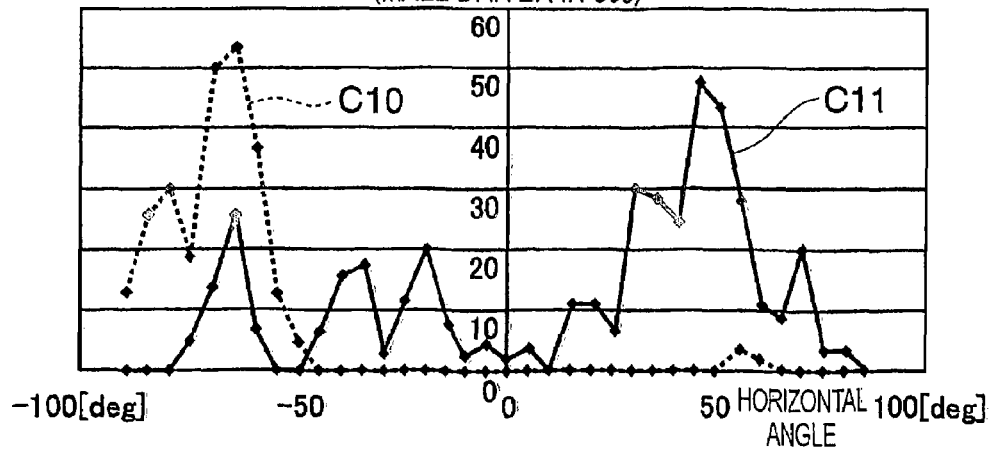
FIG. 4 is a graph showing test results about distribution of view points, particularly horizontal distribution of view points, of a plurality of drivers in their thirties.

FIG. 4 shows examples of distribution of view points measured through an experimental test where a front-pillarless test vehicle was driven by a plurality of drivers. On the basis of the measured results of the distribution of view points, the front pillars in the vehicle body of the present invention are located off the peak positions of the distribution of view points and in the neighborhood of the peak positions. Namely, for a vehicle with a right-hand steering wheel (i.e., right-hand drive vehicle), the vehicle body of the present invention is manufactured in such a manner that the front pillars are located so as to secure a driver's viewing angle range of 50°-75° leftward (i.e., counter-clockwise) from a straight-ahead direction represented by a reference straight line (i.e., zero-angle reference straight line) C1 of FIG. 1 extending in the longitudinal or front-and-rear direction of the vehicle through the center of the driver's seat and another driver's viewing angle range of 35°-60° rightward (i.e., clockwise) from the straight-ahead direction represented by the reference straight line C1; namely, in this case, the vehicular body is manufactured in such a manner that the front pillars are located at positions outside the above-mentioned driver's viewing angle ranges. For a vehicle with a left-hand steering wheel (i.e., left-hand drive vehicle), the vehicle body of the invention is manufactured in such a manner that the front pillars are located so as to secure a driver's viewing angle range of 35°-60° leftward (i.e., counterclockwise) from the straight-ahead direction represented by the zero-angle reference straight line C1 and another driver's viewing angle range of 50°-75° rightward i.e., clockwise) from the zero-angle reference straight line C1; namely, in this case too, the vehicular body is manufactured in such a manner that the front pillars are located at positions outside the left and right driver's viewing angles.

Namely, in the present invention, the first right front pillar 11 and the first left front pillar 13 are disposed closer to the longitudinal centerline of the vehicle than the respective front corner sections of the vehicle compartment, and a right corner window 25 is provided between the first and second right front pillars 11 and 12 while a left corner window 26 is provided between the first and second left front pillars 13 and 14. The right corner window 25 is positioned to secure the driver's viewing angle range of 35°-60° rightward from the zero-angle reference straight line C1, and the left corner window 26 is positioned to secure the driver's viewing angle range of 50°-75° leftward from the zero-angle reference straight line C1. As will be detailed later, the first and second right front pillars 11 and 12 and the first and second left front pillars 13 and 14 are formed between the roof 19 and the bonnet 20 of the vehicle as if extending vertically upright as viewed from the eye point position of the vehicle driver.

Namely, in the first embodiment of the present invention, the left and right front pillars (A-pillars) 11 and 13 are located closer to the longitudinal centerline of the vehicle 10 so as to avoid the peak positions in the distribution of view points experimentally obtained through the test in which the test driver visually confirmed safe conditions in left and right directions. Further, the auxiliary or second front pillars (also referred to as "A'-pillars") 12 and 14 are additionally provided to increase the strength of door window sections having been increased in area as compared to those in the conventional counterparts and located to avoid the peak positions in the distribution of view points.

Further advantage of the inventive vehicle body structure is that, because the number of the pillars can be increased, the individual pillars can have reduced widths if the vehicle body only has to have strength equal to that in the conventional counterparts. In the present invention, the widths (i.e., horizontal widths as viewed by the driver) of the front pillars are each set at about 60 mm or below that is substantially equal to a distance between the two eyes of an average Japanese adult; thus, the driver can visually recognize any object present beyond the pillars, with at least one of the left and right eyes, without greatly changing his or her position or posture. Namely, the inventive vehicle body structure can completely avoid any field-of-vision blocking area from being produced by the pillars.

Next, a description will be given about an experimental test for determining positions of the front pillars in the vehicle employing the first embodiment of the vehicular body structure. In the test, distribution of view points as each test driver visually confirmed safe conditions around the vehicle in actually turning the vehicle to the left and right was measured and carefully studied. More specifically, a front-pillarless vehicle as illustratively shown in FIG. 2 was manufactured by way of trial, and an experimental test was conducted using the test vehicle, in which distribution of view points during left- and right-turns at a 90° intersection was measured; the view points were measured using an eye mark recorder.

Figure 2:
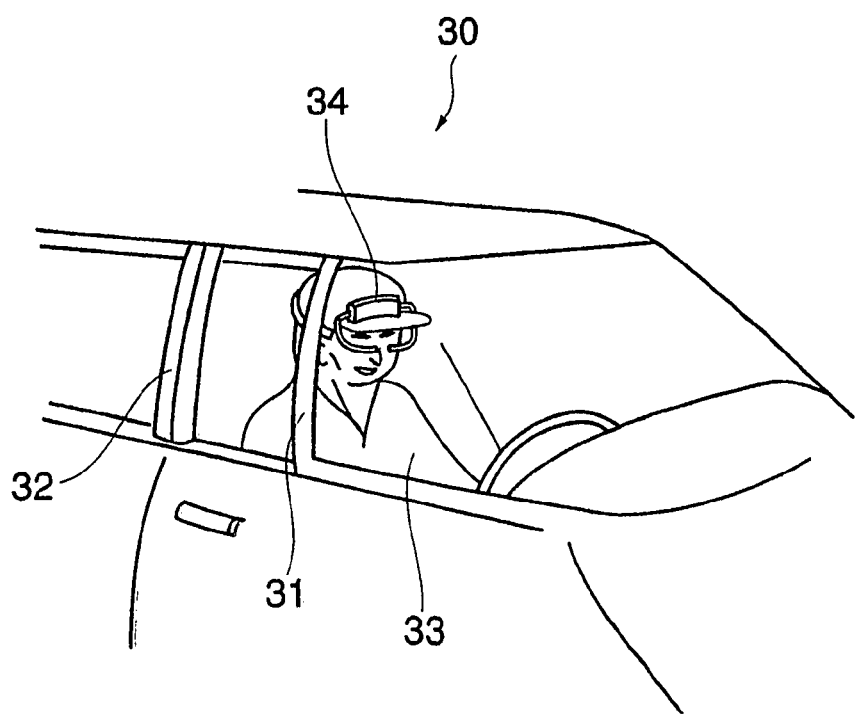
FIG. 2 is a perspective view showing an experimental or test vehicle.

The test vehicle 30 of FIG. 2, which includes side pillars 31 and 32, is equipped with no front pillar. Driver's seat is in the right side of the test vehicle 30, and the eye mark recorder 34 for measuring view points is attached to the driver 33. Using such a front-pillarless vehicle, it is possible to ascertain how the driver confirms safe conditions in a state where the field of vision of the driver is not limited or restricted.

The experimental test was carried out in the following manner. The test driver was a male driver in his thirties. Fundamentally, each of the conventionally-known pillars has a three-dimensional position, and positional relationship relative to the driver differs between upper and lower portions of the pillar. The experimental test was intended to preferentially optimize positions of the pillars in a given horizontal plane generally at the height of the eyes which are most important to visually confirmation of safe conditions around the vehicle (i.e., visual surrounding confirmation).

As the driver turns the test vehicle 30 to the left and right at an ordinary intersection, distribution of view points of the driver was measured with the eye mark recorder 34.

Figure 3:
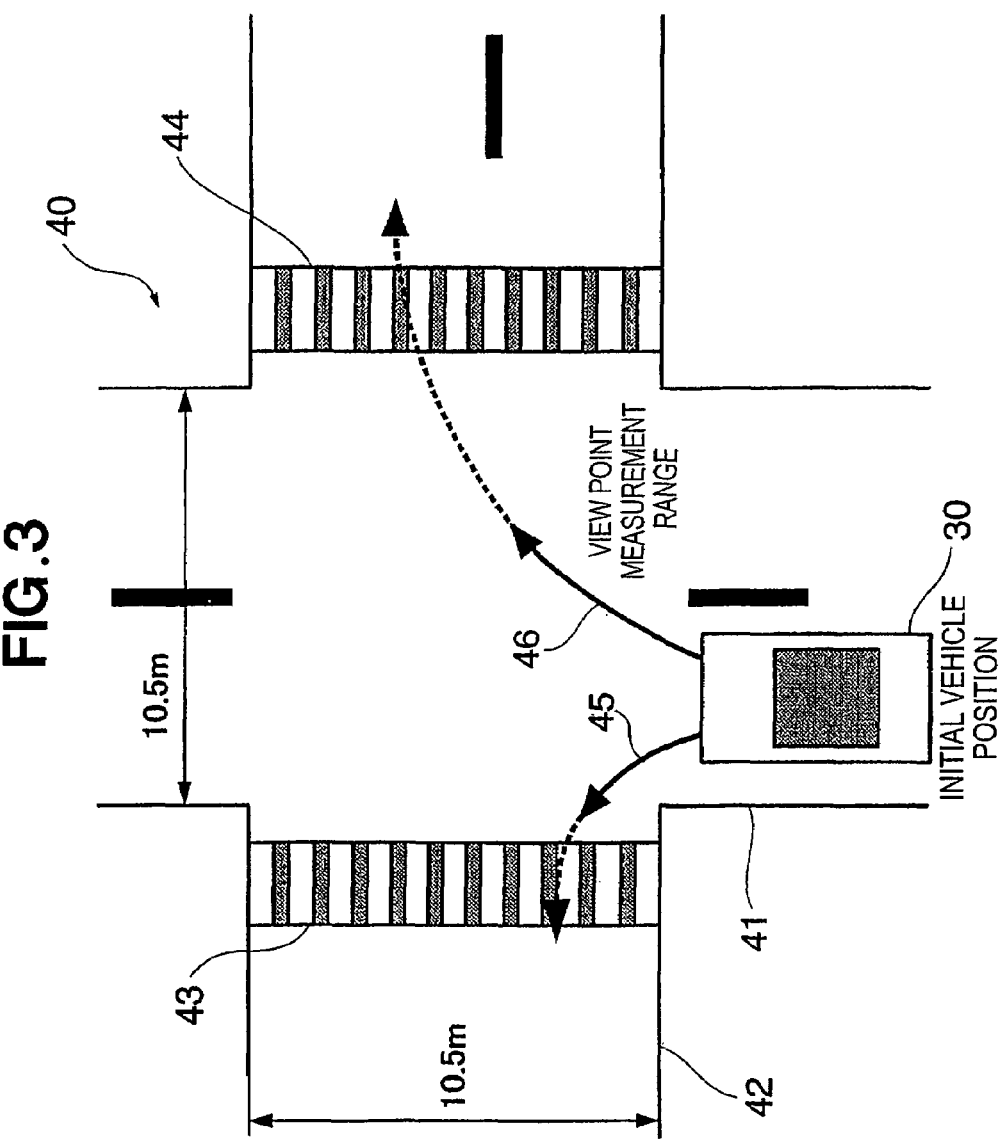
FIG. 3 is a top plan view of the test vehicle proceeding to an intersection.

In the test, an orthogonal intersection 40 where two-lane (or two-track) roads, each having a road width of 10.5 m as specified by the Road Structure Ordinance, intersect with each other as illustratively shown in FIG. 3 was selected as a most common example of the intersection. At the intersection 40, there was no particular eye-catching object that would adversely affect the measurement of distribution of view points of the driver.

FIG. 3 is a plan view of the test vehicle 30 proceeding into the intersection 40 where two roads 41 and 42, each having a 10.5 m road width, intersect with each other. In the Figure, reference numerals 43 and 44 represent crosswalks. The test vehicle 30 is shown as proceeding from the road 41 into the intersection 40. In the test, angles, on plane coordinates, of the driver's sight line relative to the vehicle 30 were sampled, at predetermined time intervals of 33 ms, for both a case where the vehicle 30 took a left-turning route as indicated by arrow 45 and a case where the vehicle 30 took a right-turning route as indicated by arrow 46.

The view point measurement was carried out for a limited range, i.e. from an initial vehicle position (straight-ahead traveling state) where the test vehicle 30 was traveling straight ahead on the road 41 to a 45°-turned position where the vehicle has been turned through 45° by the driver. Because, beyond the 45°-turned position, the sight line (or view point) of the driver is generally fixed in a forward direction of the new (i.e., turned-to) road 42 so that view point distribution in various directions can not be obtained any more.

FIG. 4 is a graph showing results of the test performed by the male test driver in his thirties who has an average physical size. In FIG. 4, the horizontal axis represents variation in the horizontal angle of the driver's sight line relative to the straight-ahead traveling direction of the vehicle, and positive values represent angles in the rightward direction while negative values represent angles in the leftward direction. Further, in FIG. 4, the vertical axis represents frequencies of individual horizontal angles of the driver's sight line sampled as the driver turned the vehicle 30 to the left and right. More specifically, a curve C10 represents view point distribution measured as the driver turned the test vehicle 30 to the left, while a curve C11 represents view point distribution measured as the driver turned the vehicle 30 to the right. With the test vehicle 30, peaks of the view point distribution could be observed at about 45° in the rightward direction and about 65° in the leftward direction. Namely, it can be seen that, in an ideal field-of-view condition where there is no field-of-vision blocking object, the most frequent surrounding-confirming angle is about 45° in the rightward direction (i.e., during a right turn) and about 65° in the leftward direction (i.e., during a left turn). As also seen in FIG. 4, the view point distribution C11 measured during the right-turn operation is wider than the view point distribution C10 measured during the left-turn operation; because, the right turn requires a longer travel around the center of the intersection and hence a longer time than the left turn, during which the driver has to perform surrounding-confirming operation while shifting the sight line (or view point) in a plurality of directions.

The following paragraphs describe in detail the front pillars of the present invention which are designed, on the basis of the aforementioned experimental test results, to allow the driver to suitably confirm safe conditions around the vehicle while avoiding the problems of the conventional techniques that (1) the vehicle body can not have sufficient strength and (2) the vehicle body is complicated in structure.

Figure 5:
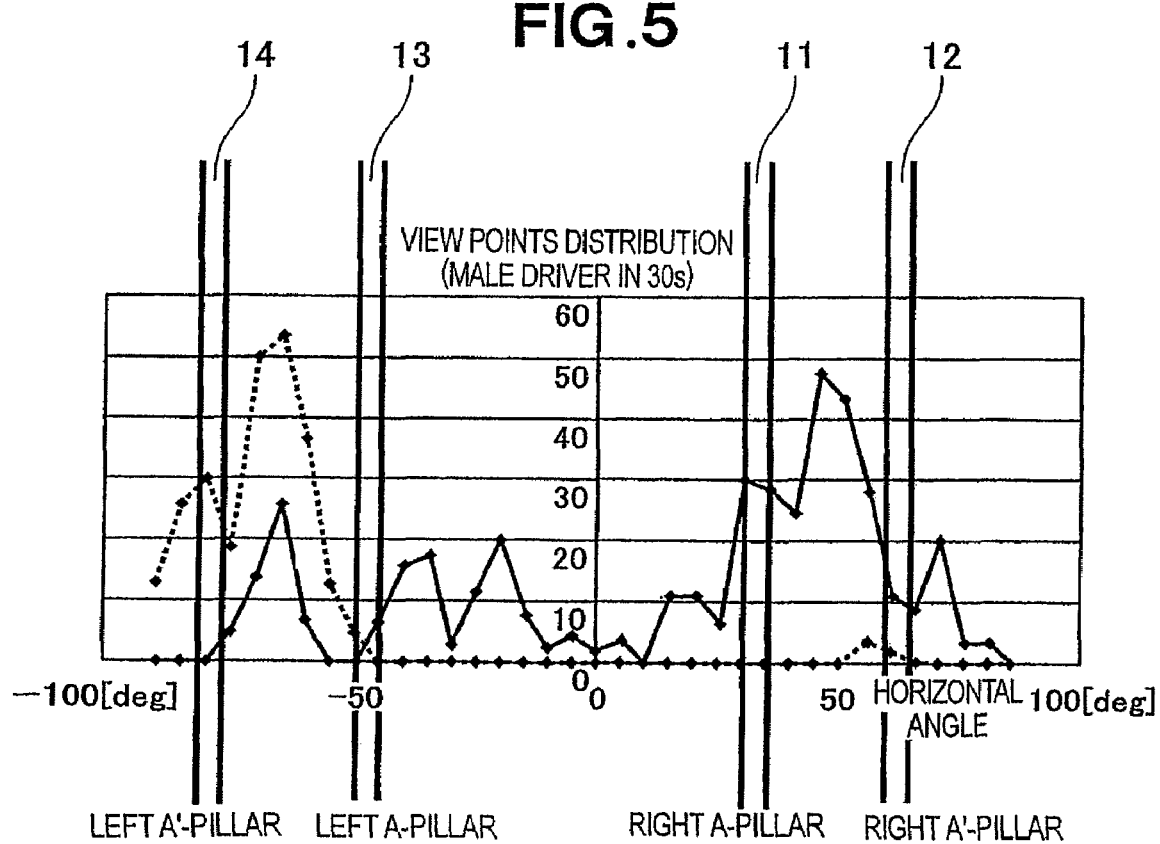
FIG. 5 is a graph explanatory of positions of the pillars to be determined on the basis of the test results.

FIG. 5 is a graph showing example relationship between the distribution of view points of FIG. 4 and the front pillars 11-14 of the present invention. As seen in FIG. 5, the front pillars 11-14 are disposed at positions avoiding the peaks in the distribution of view points measured during left- and right-turn operation of the vehicle. Note that the angular positions of the front pillars 11-14 are measured at the height of the eye point of the driver having the average physical size. After intermediate positions, in the plane of the eye point height, of the individual pillars are determined, positions of upper and lower portions of the individual pillars are determined.

Figure 6:
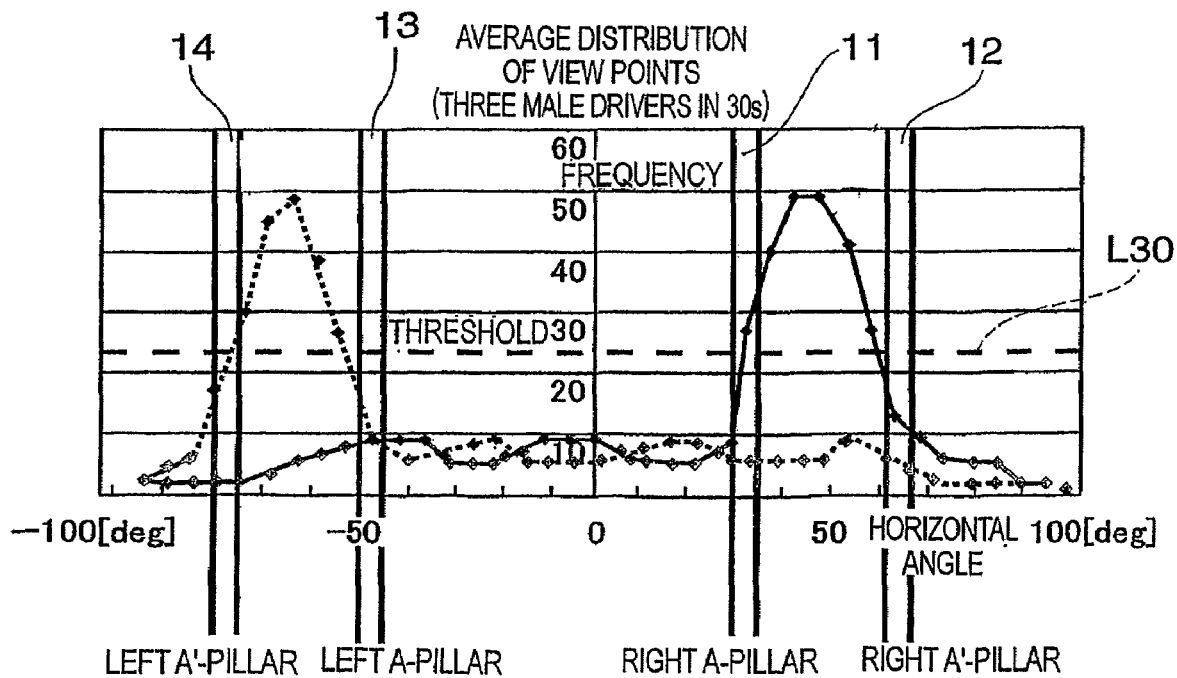
FIG. 6 is a graph showing results of an experimental test performed by three male drivers each having an average physical size, which more particularly shows average horizontal distribution of view points of the drivers measured during left- and right-turn operation.

FIG. 6 is a graph showing results of an experimental test performed by a plurality of drivers different from the one of FIG. 4, and it more particularly shows average distribution of view points measured as three male drivers in their thirties, each having the average physical size, turned the test vehicle to the left and right as described above. Specific manner of the experimental test and details of the coordinates of the graph are similar to those described above in relation to FIG. 4. As shown in FIG. 6, test results similar to those in FIG. 4 could be obtained even from the turning operations by the plurality of drivers different from the one of FIG. 4.

From the graph of FIG. 6, it can be seen that the pillars can be positioned to appropriately suit natural peripheral condition confirmation if disposed at positions avoiding the peak positions in the distribution of view points. However, if the pillars are disposed at such positions that excessively avoid (i.e., are excessively remote from) the peak positions in the distribution of view points measured during left and right turns, the front pillars 11 and 13 would be located too close to the longitudinal centerline (i.e., straight-ahead direction), thereby undesirably sacrificing the outward visibility during straight-ahead driving of the vehicle. Thus, in the instant embodiment of the present invention, each of the peak portions in the distribution of view points is sliced with a predetermined threshold value (indicated by a dotted line L30), to achieve optimization. The threshold value indicated by the dotted line L30 is determined so as to appropriately include a region from the rise to peak of each mountain-shaped portion of the curve. In the illustrated example of FIG. 6, the peak frequency value in the view point distribution is "48" in both of the left-turn- and right-turn-related measurements, and thus the frequency value "24", which is half of the peak frequency value "48", is employed as the threshold value to be used for determining whether the frequency is high or low. Consequently, at the height of the eye point of the driver having the average physical size, the front pillars 11-14 are located along the horizontal angle direction of FIG. 6. Let it be assumed here that the threshold value L30 is properly set in accordance with the sizes and strength of the front pillars 11-14, positional balance between the front pillars 11-14 and other pillars, type and size of the vehicle, inclination (or habit) in customer's view point distribution during the customization operation, etc.

FIG. 7 is a plan view showing angles of sight lines from the driver toward the positions of the pillars, on which is based the vehicular body structure of the present invention. As shown, the second left front pillar 14 is at an orientational position of about −80°, the first left front pillar 13 is at an orientational position of about −45°, the first right front pillar 11 is at an orientational position of about 30°, and the second right front pillar 12 is at an orientational position of about 65°.

In addition to the aforementioned, it is only necessary to determine positions at which the respective lower portions of the pillars are to be connected to the main part of the vehicular body (i.e., lower-pillar-portion connecting points) and positions at which the respective upper portions of the pillars are to be connected to the roof (i.e., upper-pillar-portion connecting points). In determining these positions, respective three-dimensional shapes of the pillars may be determined, taking into account the strength, air resistance and design of the vehicular body.

FIG. 8 is a plan view explanatory of how the positions of the pillars are determined according to the embodiment of the present invention.

In a vehicle 50, a three-dimensional occupant cabin border L40 and roof border L41 are first determined in accordance with vehicle merchantability requirements. Then, planes P10, P11, P12 and P13 vertical to the ground surface, including the pillar orientations determined from the view point distribution graph, are considered. Then, points D10, D11, D12 and D13 at which the planes P10, P11, P12 an P13 intersect with the occupant cabin border L40 are set as the lower-pillar-portion connecting points, and points D20, D21, D23 and D24 at which the planes P10, P11, P12 and P13 intersect with the roof border L41 are set as the upper-pillar-portion connecting points. Now that the opposite ends of the individual pillars have been determined, the lower-pillar-portion connecting points and the corresponding upper-pillar-portion connecting points are interconnected to thereby determine actual spatial positions of the individual pillars.

The front pillars designed in the above-described inventive manner look, from the eye point position of the driver, as if extending vertically upright from the ground surface. As compared to the conventional pillars extending diagonally across the driver's field of vision, the inventive pillars provided in such a manner that, as viewed from the eye point position of the driver, the inventive pillars look as if standing vertically upright can minimize shadows of the pillars, assuming that the inventive pillars are of the same widths as the conventional pillars.

The following could be confirmed by evaluating the vehicle employing the above-described inventive arrangements. Namely, because the widths of the pillars as viewed by the driver are each set to 60 mm or below, the inventive arrangements can effectively eliminate a feeling of oppression. Because, "60 mm" is substantially shorter than the distance between the two eyes of an average Japanese adult, and the driver can, without fail, visually recognize any object present beyond the pillars, with at least one of the left and right eyes and never feels any field-of-vision blocking area. The present invention is also characterized in that it can secure substantially equal sufficient viewing angles in both the diagonally forward left direction and in the diagonally forward right direction, as seen from FIG. 8. Thus, the front window 8 is offset from the longitudinal centerline C2 toward the driver's seat side, and the left corner window 26 has an opening area greater than the right corner window 25.

FIG. 9 is a plan view of a vehicular body structure according to a second embodiment of the present invention.

The second embodiment is generally similar to the first embodiment except that the left and right A' pillars (auxiliary or second pillars) in the first embodiment are not included in the second embodiment. In FIG. 9, the same elements as those in the first embodiments are indicated by the same reference numerals as in FIG. 1 and will not be described here to avoid unnecessary duplication. The second embodiment is characterized in that it can secure sufficient vehicular body strength despite a greater door window opening; in this embodiment too, the pillars are disposed at positions of low view point frequency identified from the aforementioned experimental tests. With such arrangements, the second embodiment can even further improve the field of vision.

Figure 10:
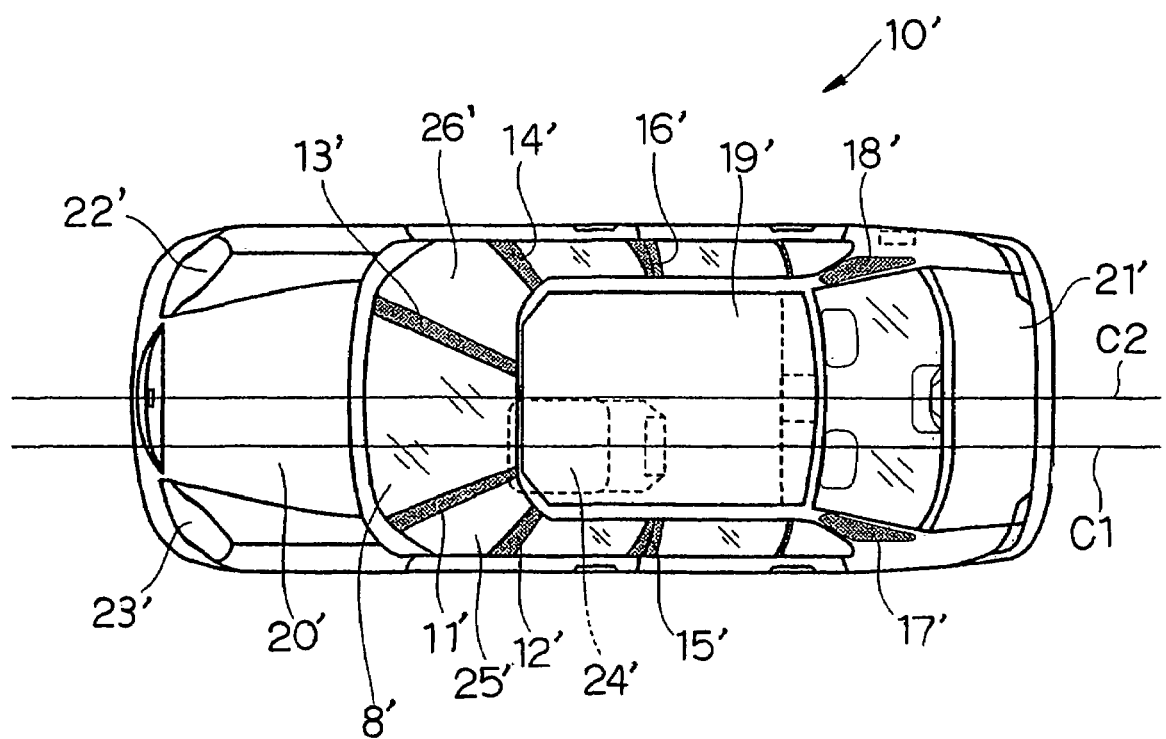
FIG. 10 and FIG. 11 are top plan views showing a left-hand-steering-wheel vehicle employing the body structure according to the present invention.
Figure 11:
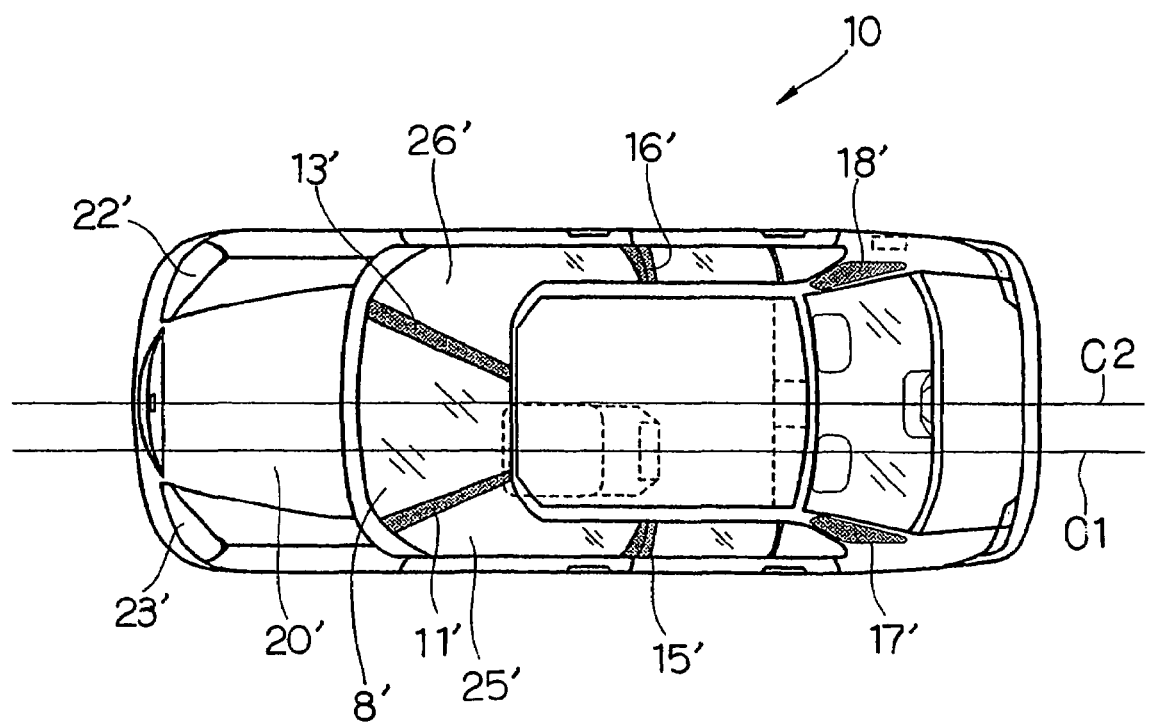

Although the present embodiment has been described in relation to a right-hand-steering-wheel vehicle, the present invention may be applied in the same manner to a left-hand-steering-wheel vehicle, as shown in FIGS. 10 and 11. In these Figures, parts corresponding to those of FIGS. 1 and 9 are designated by like reference numerals and their detailed discussions are omitted.

Although both the first and second embodiments are directed to an example of a left-right asymmetric arrangement with respect to the vehicle longitudinal centerline C2, it is also possible to provide a left-right symmetric arrangement while avoiding the peak positions of the distribution of view points. Such a left-right symmetric arrangement is advantageous in that it may be readily applied to both a right-hand-steering-wheel vehicle and a left-hand-steering-wheel vehicle.

The present invention is characterized primarily in that the left and right front pillars 11 and 13 are disposed closer to the longitudinal centerline of the vehicle than in the conventional vehicles, that the front window 8 is offset from the longitudinal centerline toward the driver's seat, and that the left corner window 26 has a greater opening area than the right corner window 25. With such characteristic arrangements, the present invention can secure substantially-equal viewing angles in both of the diagonally forward left and right directions, which should be significant improvements over the conventional counterparts.

Further, the present invention is characterized in that it can prevent the front pillars 11 and 13 from being positioned unnecessarily too close to the centerline, by use of the appropriately-set threshold value L30, that the front pillars 11 and 13 are provided so as to look, in the eyes of the driver, as if the front pillars 11 and 13 are standing vertically upright, and that the front pillars 11 and 13 each have a width less than 60 mm. With these arrangements, the present invention can secure a good field of vision in the forward direction similarly to the conventional counterparts. Note that the front pillars 11 and 13 may have a width greater than 60 mm depending on the positions of the pillars.

Furthermore, because the positions of the front pillars 11 and 13 are set as illustrated in FIGS. 1, 5, 6 and 9 on the basis of the results of the tests on distribution of view points, the present invention can achieve an optimal environment for visually confirming safe conditions around the vehicle.

Note that, with the intensity of the pillars, size of the vehicle, etc. take into account, the pillar 12 in the embodiment of FIG. 1 may be dispensed with in order to even further improve the field of vision in the diagonally forward right direction.

It should be appreciated that the application of the present invention is not limited to four-wheel vehicles; for example, the basic principles of the present invention may be applied to other vehicles driven to travel on free tracks. In an alternative, the pillars may be formed to have some bulge for increased strength.

INDUSTRIAL APPLICABILITY

The present invention can be suitably used in vehicles where a field of vision is to be improved without the vehicular body strength being sacrificed.

The invention claimed is:

1. A vehicular body structure comprising left and right front pillars provided closer to a longitudinal centerline of the vehicle than outermost forward left and right corner sections of a compartment of the vehicle,
   wherein said left and right front pillars are provided at horizontal opposite ends of a front window that is provided to have a vertical centerline thereof offset from the longitudinal centerline of the vehicle toward a driver's seat of the vehicle.

2. The vehicular body structure as claimed in claim 1, wherein said left and right front pillars each have a horizontal width of 60 mm or below.

3. A vehicular body structure comprising left and right front pillars provided closer to a longitudinal centerline of the vehicle than outermost forward left and right corner sections of a compartment of the vehicle,
   wherein said left and right front pillars are provided at horizontal opposite ends of a front window that is provided to have a center of gravity thereof offset from the longitudinal centerline of the vehicle toward a driver's seat of the vehicle.

4. A vehicular body structure comprising: a first corner window provided adjacent to one of left and right front pillars which is more remote from a driver's seat; and a second corner window provided adjacent to other of the left and right pillars which is closer to the driver's seat, wherein said first corner window has a greater opening area than said second corner window.

5. The vehicular body structure as claimed in claim 4, wherein said left and right front pillars are provided at horizontal opposite ends of a front window that is provided to have a vertical centerline thereof offset from the longitudinal centerline of the vehicle toward the driver's seat.

6. The vehicular body structure as claimed in claim 4, wherein said left and right front pillars are provided at horizontal opposite ends of a front window that is provided to have a center of gravity thereof offset from the longitudinal centerline of the vehicle toward the driver's seat.

7. The vehicular body structure as claimed in claim 4, wherein said left and right front pillars each have a horizontal width of 60 mm or below.

8. A vehicular body structure for a vehicle with a right-hand steering wheel, said vehicular body structure comprising: a right corner window provided in a predetermined position to secure a driver's viewing angle range of 35°-60° rightward from a reference straight line extending in a front-and-rear direction of the vehicle through a center of a driver's seat of the vehicle; and a left corner window provided in a predetermined position to secure a driver's viewing angle range of 50°-75° leftward from the reference straight line.

9. The vehicular body structure as claimed in claim 8, which further comprises first and second right front pillars provided at horizontal opposite ends of said right corner window, and first and second left front pillars provided at horizontal opposite ends of said left corner window.

10. The vehicular body structure as claimed in claim 9, wherein said first right front pillar and said first left front pillar each have a horizontal width of 60 mm or below.

11. The vehicular body structure as claimed in claim 8, which further comprises a right front pillar and a right side pillar that are provided at horizontal opposite ends of said right corner window, and a left front pillar and a left side pillar that are provided at horizontal opposite ends of said left corner window.

12. The vehicular body structure as claimed in claim 11, wherein said right front pillar and said left front pillar each have a horizontal width of 60 mm or below.

13. A vehicular body structure for a vehicle with a left-hand steering wheel, said vehicular body structure comprising: a left corner window provided in a predetermined position to secure a driver's viewing angle range of 35°-60° leftward from a reference straight line extending in a front-and-rear direction of the vehicle through a center of a driver's seat of the vehicle; and a right corner window provided in a predetermined position to secure a driver's viewing angle range of 50°-75° rightward from the reference straight line.

14. The vehicular body structure as claimed in claim 13, which further comprises first and second right front pillars provided at horizontal opposite ends of said right corner window, and first and second left front pillars provided at horizontal opposite ends of said left corner window.

15. The vehicular body structure as claimed in claim 14, wherein said first right front pillar and said first left front pillar each have a horizontal width of 60 mm or below.

16. The vehicular body structure as claimed in claim 13, which further comprises a right front pillar and a right side pillar that are provided at horizontal opposite ends of said right corner window, and a left front pillar and a left side pillar that are provided at horizontal opposite ends of said left corner window.

17. The vehicular body structure as claimed in claim 16, wherein said right front pillar and said left front pillar each have a horizontal width of 60 mm or below.

* * * * *